United States Patent [19]

Kuse

[11] Patent Number: 5,161,662
[45] Date of Patent: Nov. 10, 1992

[54] PALLET CHANGING MECHANISM FOR MACHINE TOOL AND CONNECTOR DEVICE USED THEREFOR

[75] Inventor: Hisao Kuse, Ishikawa, Japan

[73] Assignee: Tsudakoma Kogyo Kabushiki Kaisha, Kanazawa, Japan

[21] Appl. No.: 507,464

[22] Filed: Apr. 11, 1990

[30] Foreign Application Priority Data

Apr. 14, 1989 [JP] Japan .................................. 1-96065
May 17, 1989 [JP] Japan .................................. 1-123768

[51] Int. Cl.⁵ ...................... B65G 15/64; B65G 21/20; B23Q 7/00
[52] U.S. Cl. .............................. 198/345.3; 198/346.1; 29/33 P; 29/563; 483/69
[58] Field of Search .................. 198/345.3, 346.1, 345, 198/472, 339; 29/568, 33 P, 563

[56] References Cited

U.S. PATENT DOCUMENTS

| | | | |
|---|---|---|---|
| 3,709,377 | 1/1973 | Sturm | 29/568 |
| 4,373,840 | 2/1983 | Miller, Jr. | 198/345.3 |
| 4,449,277 | 5/1984 | Hasegawa | 198/345.3 |
| 4,747,193 | 5/1988 | Hashidate | 198/346.1 |

Primary Examiner—Joseph F. Peters, Jr.
Assistant Examiner—Kenneth Lee
Attorney, Agent, or Firm—Oblon, Spivak, McClelland, Maier & Neustadt

[57] ABSTRACT

The present invention relates to a pallet changing mechanism for a machine tool wherein when pallets loaded with works through an attachment are successively changed, an input and output cable or the like for connecting a control device of a machine tool and an attachment is automatically re-connected to an attachment next to be carried in from an attachment carried out of a machining table of the machine tool. The connector device comprises a movable portion provided on the machining table of the machine tool and a fixed portion provided on the pallet. Mounting and dismounting of the input and output cable or the like every time a pallet is changed is carried out simply and positively. A shield member is disposed on the connector device to thereby completely separate and shield a plurality of connector blocks from each other, and positive operation, detection and the like for the attachment are carried out.

7 Claims, 7 Drawing Sheets

PALLET CHANGING MECHANISM FOR MACHINE TOOL AND CONNECTOR DEVICE USED THEREFOR

BACKGROUND OF ART

This invention relates to a pallet changing mechanism for a machine tool which can move and connect a pallet loaded with an attachment such as an automatic index head on the side of the machine tool and can operate the attachment without hindrance, and a connector device used therefor.

A pallet changer has its object wherein the pallet changer is combined with an automatic machine tool like a machining center to effect an automatic unmanned operation for many hours, thus improving its service efficiency to enhance productivity. At this time, works are loaded on the pallet and are carried in and out on a processing table of the machine tool. In a case where the processing requires, for example, an angle indexing function, it is necessary to load works on the pallet through a high degree of an attachment such as an automatic index head.

Such an attachment has a drive portion and a detection portion so that a drive signal from an external source is inputted into said drive portion, and the result thereof is transmitted to the external as a feed back signal from the detection portion to realize operations such as indexing of a fixed angle. Accordingly, it is necessary to provide an input and output cable or the like between the control device of the machine tool and the attachment, and conventionally, a flexible cable having a length sufficient to reach within the range of movement of the pallet is used as a input and output cable. For example, a so-called rolling wiring in which the cable is crawled on the floor surface is employed.

In such a prior art as described above, every time the pallet moves, the input and output cable connected to the attachment on the pallet is also moved accordingly, resulting a high possibility of damaging the cable early. Various other problems unavoidably involved in that the range of movement of the pallet is restricted by the length of the cable so that an extra space at a floor is required, that work site becomes disordered, and that star-burst wirings result.

SUMMARY OF THE INVENTION

In view of the foregoing, it is a primary object of the present invention to provide an arrangement wherein input and output cables for connecting an attachment on a pallet with a control device on the side of a machine tool and the like are disposed in compact to achieve simplification of the work site. The aforesaid input between the attachment and the control device, and the input and outlet cable or the like may comprise any of electric cables and controlled fluid pipes.

Another object of the present invention is to provide an arrangement wherein even if two or more input and output cable systems are collectively disposed, the cable systems are mutually affected so as not to induce inferior operation and erroneous function.

For achieving these objects, in the present invention, a pair of connector devices with a shield member disposed thereon are employed, whereby one of the connector devices is connected to a control device through an input and output cable installed on the side of machine-tool table while the other connector device connected to an attachment is installed on the side of a pallet so that when the pallet is moved onto the machine-tool table, these connector devices are connected and the control device and the attachment are connected through the input and output cable while when the pallet is moved out, these connector devices are disengaged and the pallet is disconnected from the control device.

DETAILED DESCRIPTION OF THE INVENTION

Figure 1:
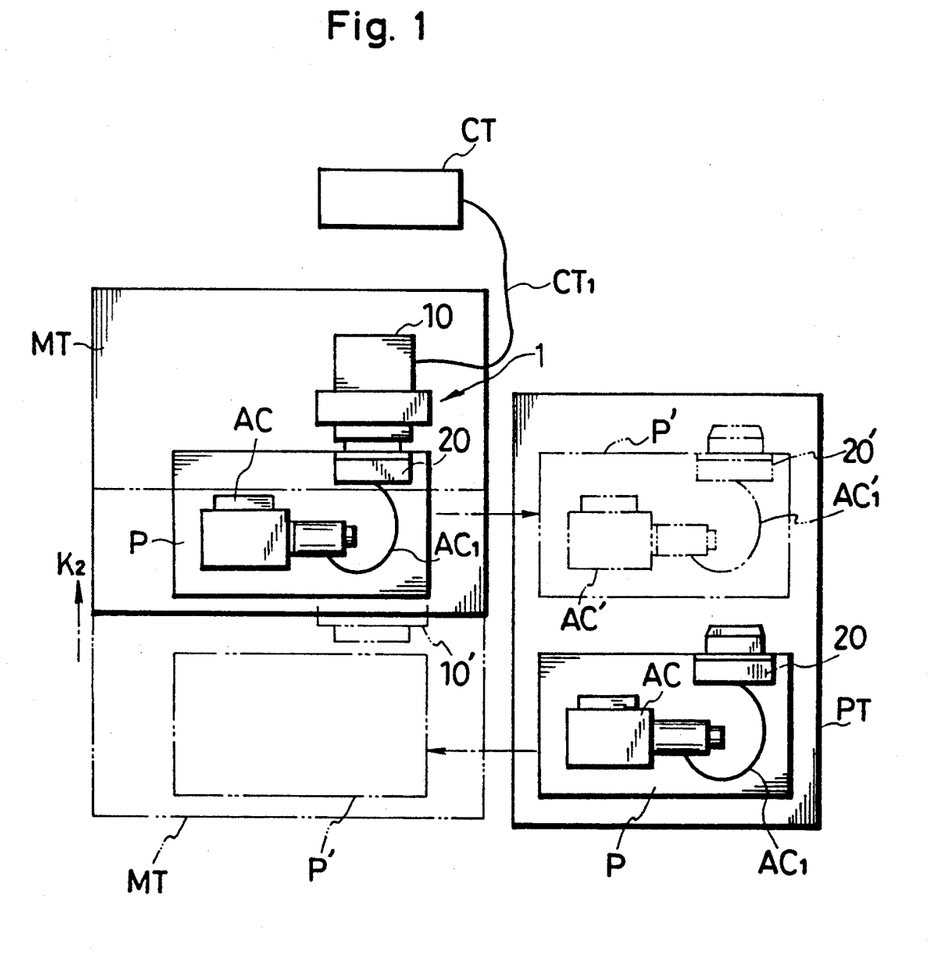
FIG. 1 is an entire conceptual view showing one example of a pallet changing mechanism according to the present invention.

Typical embodiments will be described hereinafter with reference to the drawings. As shown in FIG. 1, a pallet changing mechanism for a machine tool comprises, as principal members, a pallet table PT arranged adjacent to a machining table MT of a machine tool, a movable portion 10 of a connector device, generally indicated at 1, disposed on the machining table MT, and fixed portions 20, 20 . . . of the connector device 1 provided on each of pallets P.

The machine tool is, for example, a machining center of suitable form. The machining table MT is capable of transferring pallets P at at least two different locations as indicated by the chain-line arrow between the machining table MT and the pallet table PT (the solid line and dash-dotted contour lines in FIG. 1). The pallet table PT has the same height as that of the machining table MT and is a frame capable of loading at least two pallets P, P side by side thereon. The movable portion 10 is connected to a control device CT of a machine tool which will be described later, and the fixed portion 20 is connected to an attachment AC on each pallet.

Figure 2:
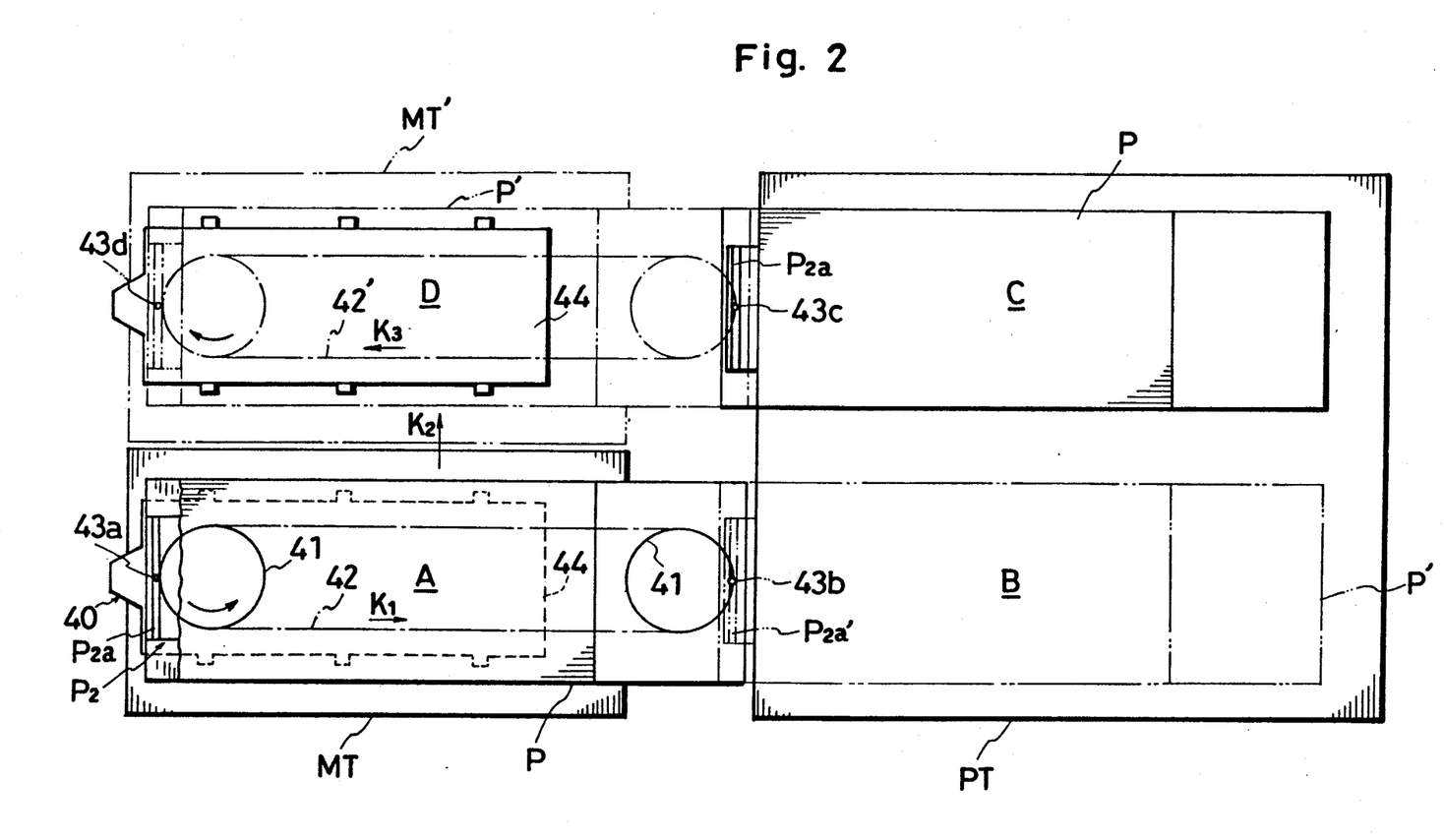
FIG. 2 is a plan view showing one example of a pallet transfer device used in the present invention.

The transfer operation of pallets P between the machining table MT and the pallet table PT is carried out by use of a pallet transfer device 40 shown in FIG. 2. The pallet transfer device 40 is provided together with a pallet clamp mechanism 44 on the machining table MT.

The pallet transfer device 40 is provided with a pair of chain sprockets 41, 41, an endless drive chain 42 over which the chain sprockets are extended, and an engaging pin 43a projected on a part of the drive chain 42. Here, one chain sprocket 41 is disposed to be projected on the side of the pallet table PT (on the right-hand in the figure).

Each pallet P is formed at the front end thereof with an engaging portion $P_2$ having an engaging groove $P_{2a}$ on the lower surface side thereof, and the engaging pin 43a is slidably engaged with the engaging groove $P_{2a}$. The pallet P carried into a predetermined position on the machining table MT can be mechanically positioned and fixed by the pallet clamp mechanism 44.

Suppose that the pallet P on the machining table MT is at a position A, when the pallet clamp mechanism 44 is opened and the drive chain 42 is driven in a direction as indicated by arrow $K_1$, the engaging pin 43a moves to a position (shown at 43b) nearest to the pallet table PT. and the pallet P can be transferred from the machining table MT to a position B on the pallet table PT. Accordingly, the pallet P can be reciprocated between the positions A and B.

When the machining table MT is further moved in a direction indicated by arrow $K_2$, the engaging pin moved to a position indicated by 43c into engagement with an engaging groove $P_{2a}$ of another pallet P located at a position C on the pallet table PT. Subsequently, when a drive chain 42' is driven in a direction indicated by arrow $K_3$, this pallet P can be transferred to a position D on the machining table MT, in which case also, the pallet P can be reciprocated between the positions C and D. In pallets P, P' on the pallet table PT, engaging grooves $P_{2a'}$ $P_{2a'}$ are orderly arranged, and the engaging pin (positions indicated by 43b or 43c) moved to the pallet table PT may be successively engaged.

The pallet P carried into a predetermined position on the machining table MT by the pallet transfer device 40 in the manner as described above is fixed by the pallet clamp mechanism 44.

On each of the pallets P are disposed an attachment AC like an automatic index head as shown in FIG. 1 and a fixed portion 20 for the connector device, and work not shown is detachably placed on the attachment AC on the pallet table PT. The attachment AC and the fixed portion 20 are connected through a short connecting cable $AC_1$.

Figure 3:
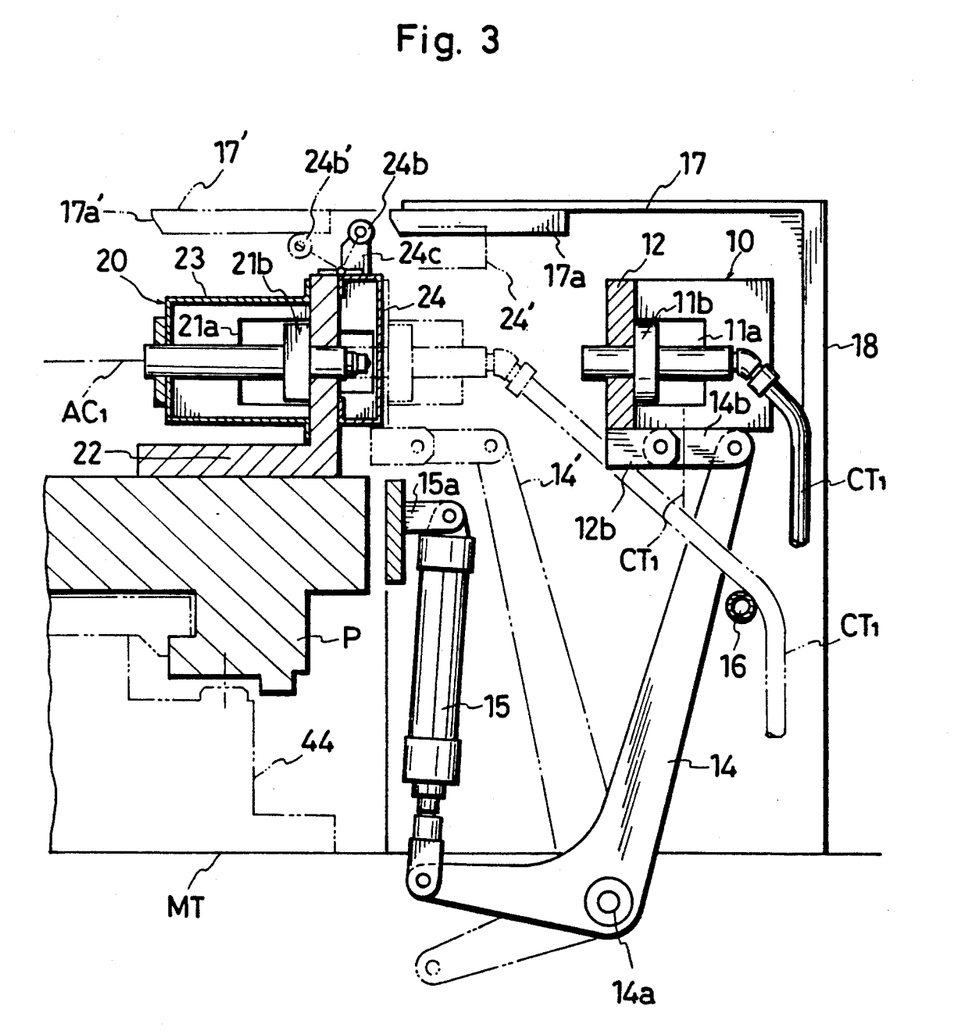
FIG. 3 is a partly cutaway explanatory view showing one embodiment of a connector device according to the present invention.
Figure 4:
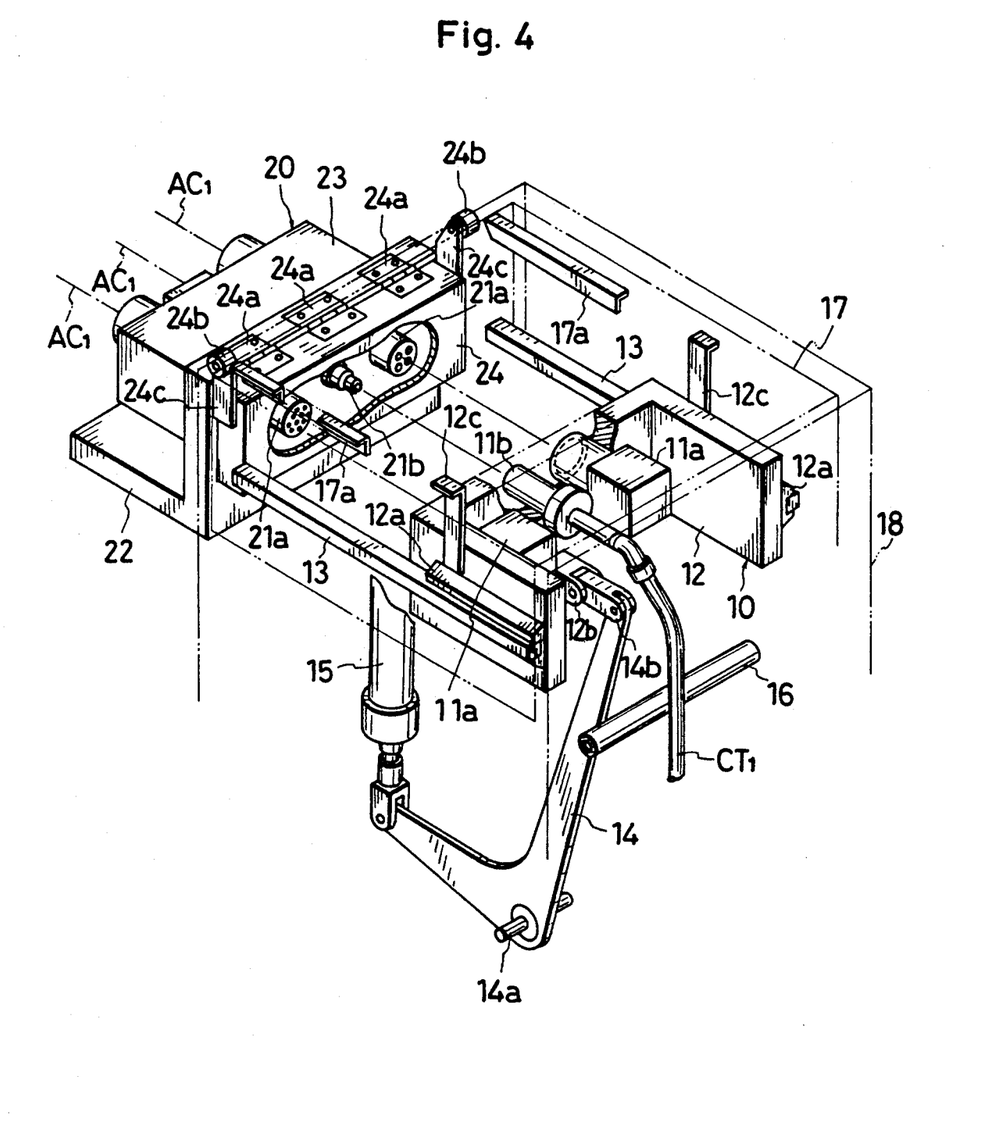
FIG. 4 is a perspective view showing essential parts of FIG. 3.

The movable portion 10 for the connector device is provided on the machining table MT and connected to a control device CT of the machine tool through a flexible cable $CT_1$ having a length capable of covering the moving range of the machining table MT. As shown in FIGS. 3 and 4, in the movable portion 10, connector blocks 11a, 11a for electricity and a connector block 11b for fluid are disposed in a row on the movable member 12. On the other hand, the fixed portion 20 is paired with the movable portion 10 and is provided with connector blocks 21a, 21a for electricity and a connector block 21b for fluid. Here, the connector blocks 11a-21a, 11b-21b facing to one another can be connected and separated. The connector blocks 11b, 21b for fluid are so-called one-touch connectors, and both the members are connected whereby they become communicated each other and separated whereby they can be automatically closed by a check valve or a stop valve.

The movable portion 10 can be detachably engaged with the fixed portion by a drive unit which comprises, as principal members, a pair of guide rails 13, 13, a swinging lever 14 and a cylinder 15.

Slide units 12a, 12a slidably engaged with the guide rails 13, 13 are secured to both sides of the movable member 12, and a rearwardly projecting connecting portion 12b is provided on the movable member 12. The lever 14 is an L-shaped member which is pivotable about the fixed shaft 14a, the lever 14 having one end connected to the connecting portion 12b through a connecting member 14b while the other end thereof being connected to a rod of the cylinder 15. The opposite ends of the connecting member 14b and the connecting portion between the lever 14 and the cylinder 15 are connected by pin-coupling to render the movable member linearly movable, the cylinder 15 having a base supported on the fixed member 15a.

A flexible cable $CT_1$ joined to the control device CT on the side of the machine tool is connected to each of the connector blocks 11a and 11b, and a flexible cable $CT_1$ with respect to the connector block 11b for fluid is guided so as to be over the fixed pipe 16 so that the radius of curvature is not excessively small.

A moving cover 17 (indicated by the chain line in FIG. 4) whose front surface is opened is mounted on the movable member 12 through brackets 12c and 12c, and a pair of actuating rods 17a and 17a are secured to the forward inner surfaces of the moving cover 17. Also, a fixed cover 18 is provided so as to cover the entirety of the movable portion 10 including the moving cover 17.

The connector blocks 21a, 21a and 21b of the fixed portion 20 are mounted on the pallet P through the bracket 22, and the cable $AC_1$ connected to the attachment A is connected. A case 23 is disposed at the rear of the connector blocks 21a, 21a and 21b. A front cover 24 to be opened upwardly is disposed on the front surface of the connector blocks 21a, 21b, and 21b through hinges 24a, 24a, ... , cam rollers 24b, 24b are projected on the opposite ends of the front cover 24 through brackets 24c, 24c, and the cam rollers 24b, 24b are disposed at positions opposed to the actuating rods 17a, 17b on the side of the movable portion 10.

When the pallet P loaded with an unmachined work is carried onto the machining table MT by the pallet transfer device 40 and positioned and fixed by the pallet clamp mechanism 44, the fixed portion 20 on the pallet P is set to be accurately confronted with respect to the movable portion 10 in the machining table MT. If the cylinder 15 is extended, the movable portion moves forward while being guided by the guide rails 13, 13 through the swinging lever 14 or the like, and finally, the movable portion 10 can be connected to the fixed portion as indicated by the chain line.

At that time, since the moving cover 17 also moves forward with the forward movement of the movable portion 10, the actuating rods 17a, 17a urge the confronting cam rollers 24b, 24b to thereby upwardly open the front cover 24, and the connector blocks 11a-21a, 11b-21b corresponding thereto are connected together. At the time when the connection between the movable portion 10 and the fixed portion 20 is completed, the moving cover 17 moves forward upwardly of the fixed portion 20, and therefore, even the fixed portion 20 can be protected even during the machining of work. By connecting the movable portion 10 and the fixed portion 20 in a manner as described above, the attachment AC on the pallet P and the control device CT are connected through the flexible cable $CT_1$, movable portion 10, fixed portion and accessory cable $AC_1$, whereby control of starting machining of work on the attachment AC and required driving control for the attachment AC can be executed by the control device CT.

After the work has been machined, the cylinder 15 is contracted and the movable portion 10 is moved backward, whereby the movable portion 10 can be separated from the fixed portion 20. At this time, the moving cover 17 is also moved backward together with the movable portion 10 and therefore, the front cover 24 on the side of the fixed portion 20 is automatically closed downwardly. Thereafter, the pallet P is carried onto the pallet table PT, and a new pallet P loaded with an unmachined work is carried into the machining table MT in the aforementioned procedure. Similar procedure may be repeated.

In the foregoing, the connector blocks 11b, 21b for fluid may be of either hydraulic or pneumatic. The number and kind of the connector blocks 11a, 11b, 21a, 21b used may be suitably determined other than the illustrated.

Moreover, if a separate movable portion having the same structure as the movable portion 10 on the machining table MT or a dummy device having the same shape as the aforesaid movable portion is arranged at a predetermined position on the pallet table PT, when the pallet P is carried onto the pallet table PT, it is possible to prevent the fixed portion 20 on the pallet P from being unexpectedly contaminated and prevent inconveniences such as entry of chips or the like therein.

It is to be noted that the pallet table PT may be disposed on the opposite sides of the machining table MT, and one or more pallets P, P . . . may be loaded on the pallet table PT. The pallet transfer device 40 may be arranged on the side of the pallet table PT. If the aforementioned structure of the present invention is employed, the necessity of moving the pallet while dragging the flexible cable can be completely eliminated as experienced in prior art, and accordingly, there provides an excellent effect capable of clearing all problems resulting therefrom.

Another Embodiment

For the input and output cable connected in the aforementioned fixed portion and movable portion, there requires, in addition to a power signal for drive, a low level control signal such as an index instruction signal and an output signal of an index angle sensor. Therefore, various conditions such that a separate shield between both the signals is complete, it can withstand an inferior working environment and the like need be fulfilled. In view of the foregoing, connector devices shown in FIGS. 5 and 6 were developed.

Figure 5:
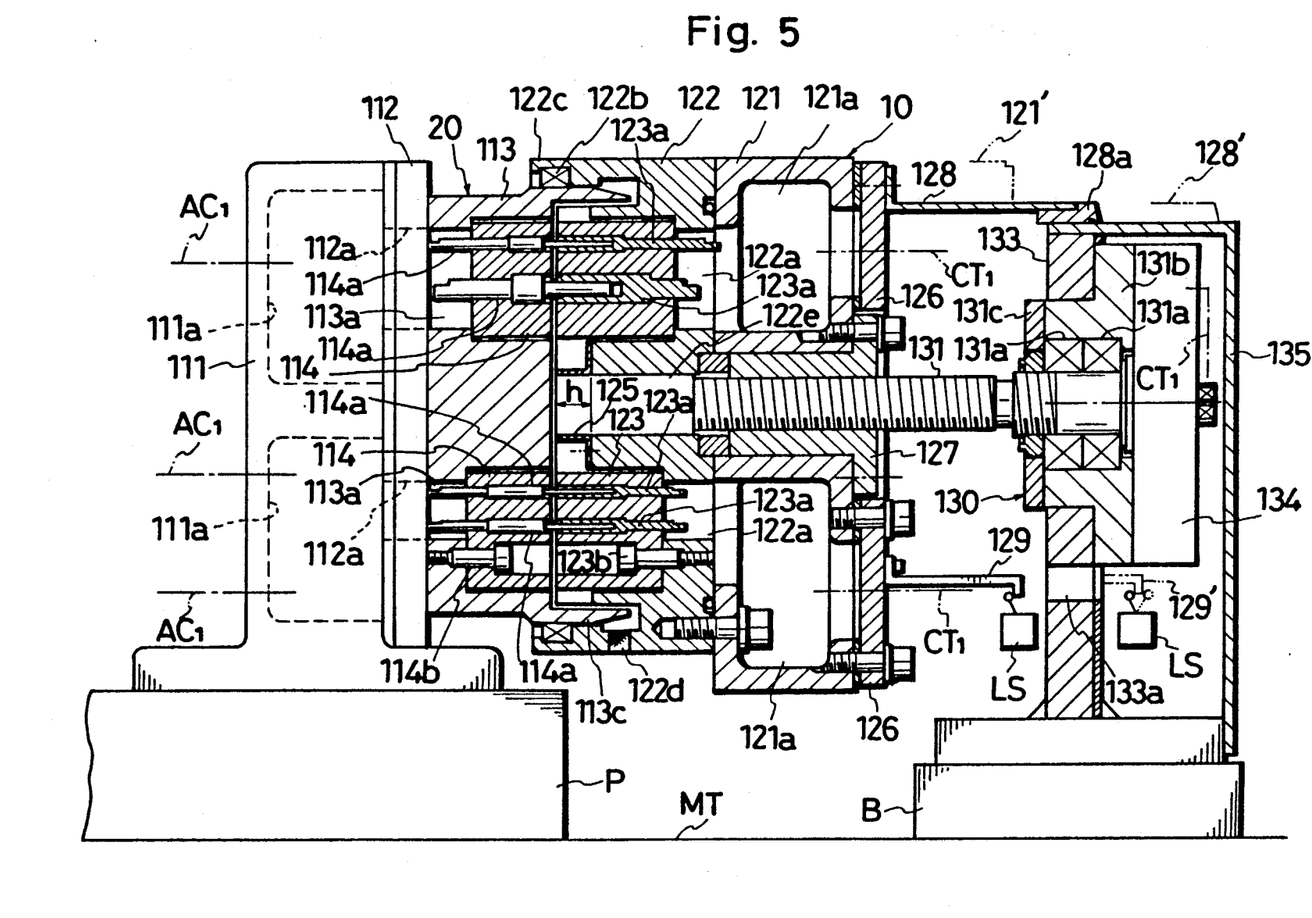
FIG. 5 is a side sectional view showing another embodiment of the connector device according to the present invention.
Figure 6:
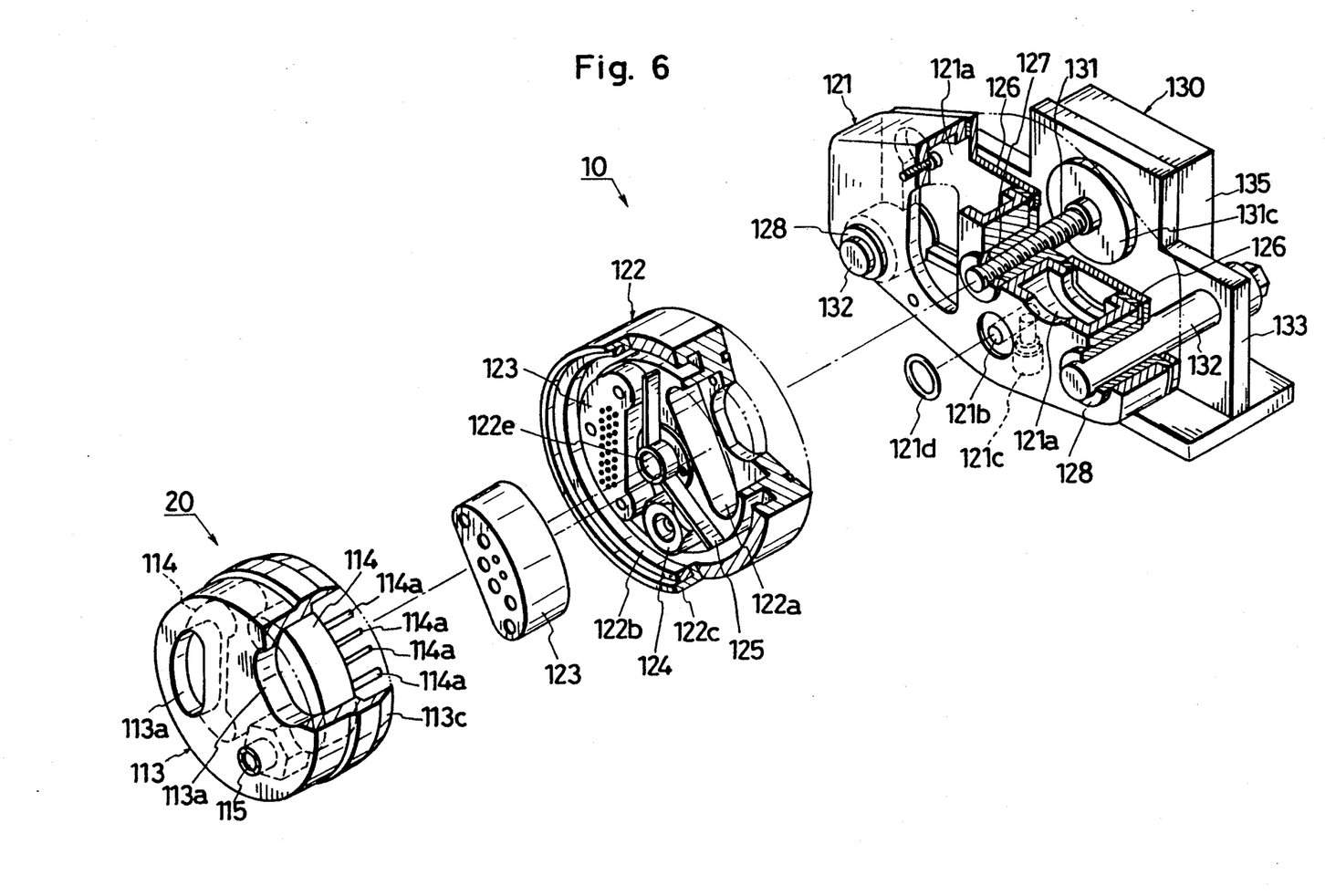
FIG. 6 is a perspective view of an assembly of the connector device of FIG. 5.

The fixed portion 20 comprises, as principal members, a base member 111, a connector unit 113 secured to the front surface of the base member 111 through a cover plate 112, and a connector block 114 for electricity and a connector block 115 for fluid which are incorporated in the connector unit 113.

The connector blocks 114, 114 for electricity comprise insulating members having connector pins 114a, 114a . . . mounted thereof, and are encased in stepped deformed holes 113a, 113a formed on the connector unit 113 and fixed by bolts 114b. The connector pins 114a, 114a . . . used have different diameters according to a required capacity of current, and front ends thereof are projected to the front surface of the connector blocks 114, and rear portions thereof extend through the connector blocks 114 into the rear portions of the deformed holes 113a so that the former may be connected to the respective input and output cables $AC_1$.

Figure 7:
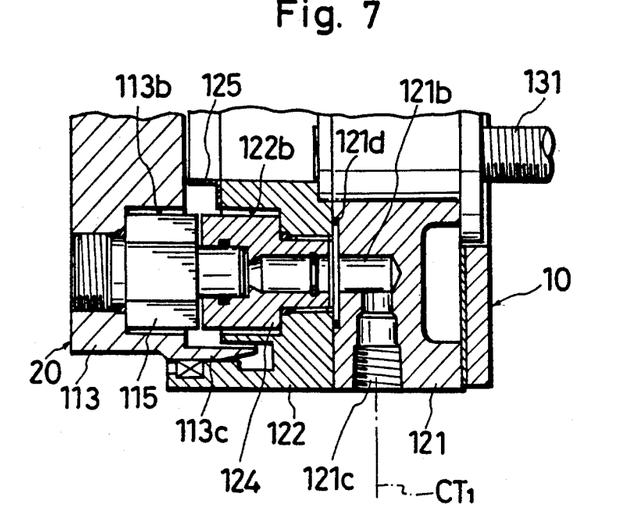
FIG. 7 is a partly enlarged view of FIG. 6.

The connector block 15 for fluid is also encased in a stepped hole 113b formed in the connector unit 113 (see FIG. 7). The connector block 115 forms a so-called one-touch fluid coupling together with the connector block 124 on the side of the movable portion 10 paired therewith.

The connector unit 113 is a thick disk-like metal member for holding the connector blocks 114, 114, and 115, and a front end edge thereof is formed with a convergent guide ring 113c.

Legs of the base member 111 are secured onto the pallet P to form therein cable connecting spaces 11a and 11a divided for each of the connector blocks 114 and 114. The deformed hole 113a of the connector unit 113 is communicated with the corresponding cable connecting space 11a through a through hole 112a provided in the cover plate 112. The cables $AC_1$, $AC_1$ can be extended through and fixed in the cable connecting spaces 11a, 111a. The separate cable $AC_1$ for fluid can be also extended through the base member 111 and the cover plate 112 through a space not shown independently of the cable connecting spaces 111a and 111a, connected to the connector block 115 for fluid and fixed to the rear surface of the base member 111.

The movable portion 10 comprises, as principal members, a mount member 121, a connector unit 122, connector blocks 123, 123 for electricity, and a connector block 124 for fluid.

The connector blocks 123, 123 for electricity have connector sockets 123a, 123a . . . mounted thereon and are paired with the connector blocks 114, 114 on the side of the fixed portion 20.

Figure 8:
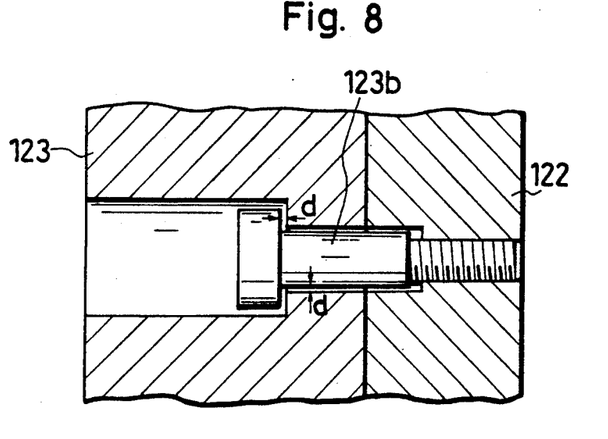
FIG. 8 is a partly enlarged sectional view of FIG. 5.

The connector unit 122 has the connector blocks 123, 123 encased in the stepped deformed holes 122a, 122a, and the connector block 124 encased in the other stepped hole 122b. However, the connector blocks 123, 123 are fastened with suitable clearances d, d through bolts 123b, and secured to the connector unit 122 by a so-called floating construction. A shield member 125 having the same height as a projected height h of the connector blocks 123, 123 is disposed on the front side of the connector unit so as to define the connector blocks 123, 123. The connector unit 122 is formed at the peripheral edge of the front surface thereof with a ring portion 122c for fitting a guide ring 113c of the connector unit 113 on the side of the fixed portion 20.

As shown in FIG. 5, the deformed holes 122a, 122a are communicated with the connecting spaces 121a, 121a of the mount member 121, and the stepped hole 122b is communicated with a fluid inlet port 121c through a communicating hole 121b formed in the mount member 121. The rear end of the connector block 124 is opened to the communicating hole 121b through an O-ring 121d as shown in FIG. 7.

The cable connecting spaces 121a, 121a are defined for the connector blocks 123, 123, respectively, and are closed by a cover plate 126 capable of having the exible cable $CT_1$ extended therethrough and fixed. A separate flexible cable $CT_1$ for fluid is connected to the fluid inlet port 121c.

A screw member 127 is mounted in the central portion of the mount member 121 and is threadedly engaged with a ball threaded shaft 131 of the drive unit 130. Guide rods 132, 132 are slidably inserted on both left and right sides of the mount member 21 through bushings 128, 128.

A supersonic motor 134 as a drive source is mounted on the base member 132 of the drive unit 130, and the ball threaded shaft 131 and the guide rods 132, 132 are projected on the front side.

The supersonic motor 134 comprises a stator constituted by attaching an elastic member such as stainless to a ring-like or disk-like piezoelectric element and a rotor in pressure contact with the stator, whereby when the piezoelectric element divided in a peripheral direction for polarization is excited under suitable conditions, only a strain of a travelling wave which travels in a peripheral direction can be produced on the surface of the elastic member, and a torque resulting from a friction between the rotor and the stator is produced in the rotor. The supersonic motor requires no winding and has not magnetic circuit, and therefore a magnetism is not generated. A small and light-weight low-speed high torque can be realized. The motor is excellent in responsiveness and position controlling properties, and has features of high retaining torque, high freedom of shape and the like.

The supersonic motor 134 is connected to the control device CT of the machine tool through the separate flexible cable $CT_1$.

The ball threaded shaft 131 is directly connected to the rotor not shown of the supersonic motor 134 and rotatably supported on the base member 133 through bearings 131a, 131a, a bearing case 131b and a bearing holder 131c.

A fixed cover 135 is disposed at the rear of the supersonic motor 134. A moving cover 128 is provided on the cover plate 126 of the movable portion 10, the moving cover 128 being slidable with respect to the fixed cover 135 through a seal packing 128a.

Limit switches LS, LS are disposed on both sides of the base member 133 of the drive unit 130, as shown in FIG. 5, and the forward limit and backward limit of the movable portion 10 can be detected by a dog 129 projected at the rear of the movable portion 10. The dog 129 extends through a through hole 133a formed in the base member 133 and can be moved forward and backward together with the movable portion 10.

In the automatic detachable connector device having the structure as described above, the supersonic motor 134 of the drive unit 130 is driven whereby the movable portion 10 can be moved forward and backward through the ball threaded shaft 131. If the fixed portion on the pallet P is set to be accurately confronted by the movable portion 10 when the movable portion 10 is loaded on the machining table MT of the machine tool and the pallet P is carried onto the machining table MT and fixed in position, the supersonic motor 134 is driven by a control signal from the control device CT, whereby the movable portion can be moved forward for continuous connection with the fixed portion 20.

When the fixed portion 20 and the movable portion 10 are connected, connection between the attachment AC on the pallet P and the control device CT can be completed through the cable $AC_1$, connector blocks 114, 114, 115 of the fixed portion 20, connector blocks 123, 123, 124 of the movable portion 10 and flexible cable $CT_1$. Accordingly, the control device CT suitably drives and controls the machine tool CT and the attachment AC to execute machining of work on the attachment AC.

After work has been machined, the supersonic motor 134 is driven to separate the movable portion 10 from the fixed portion 20, whereby the pallet P is released from relation with the control device CT and can be carried out of the machining table MT to the pallet table PT.

The connector blocks 114, 114, 123, 123 for electricity including the connecting portions to the cables $AC_1$, $AC_1$, flexible cables $CT_1$, $CT_1$ to be are accommodated in the deformed holes 113a, 113a, 122a, 122a defined for the respective connector blocks 114, 123, and cable connecting spaces 111a, 111a, 121a, 121a in the connector units 113, 122, base member 111 and mount member 121. Since they are defined by the shield member 125 also in the front surface of the connector unit 122 on the side of the movable portion 10, electric signals belonging to the different connector blocks 114, 123 are severely separately shielded from each other. Therefore, even in the case where signal levels are extremely different, harmful noises are not possibly mixed with each other.

The connector blocks 115, 124 for fluid may be accommodated in the lowermost portion of the connector units 113, 122. Oils or the like leaked from the connector blocks 115, 124 can be discharged outside through a drain outlet 122d without entering the connector blocks 114, 114, 123, 123 for electricity.

Figure 9:
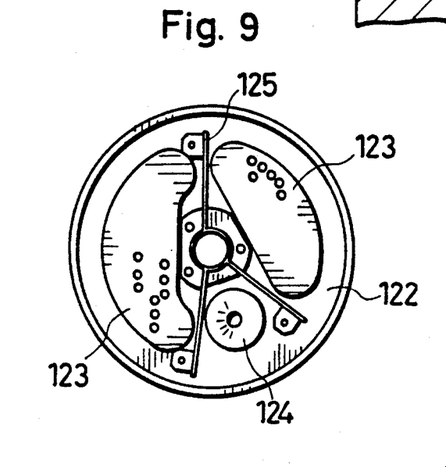
FIG. 9 is a side view showing another embodiment of the connector device according to the present invention.

FIG. 9 shows another embodiment wherein the shield member 125 partitions the connector blocks 123, 123 for electricity not only to define the front surface of the connector unit 122 of the movable portion 10 but define the front surface of the connector unit 122 for each connector block including the connector block 124 for fluid, and accordingly, even if fluid should be jetted out of the connector blocks 115, 124 for fluid, the connector blocks 114, 114, 123, 123 for electricity can be protected.

In the aforementioned explanation, the connector blocks 115, 124 for fluid may be either hydraulic or pneumatic, and these may not be included in the fixed portion 20 and the movable portion 10. Furthermore, the kind and number of the connector blocks 114, 123, 115 and 124 may be suitably combined other than the illustrated, as the case may be.

While in the connector blocks 114, 123 for electricity, the fixed portion 20 side is the male side having the connector pins 114a, 114a . . . and the movable 10 side is the female side having the connector sockets 123a, 123a . . . , it is to be noted that this setting may be reversed. Preferably, the connector block 114 is held by a floating construction in place of the connector block 123. Further, the connector pins 114a, 114a . . . , connector sockets 123a, 123a . . . may be of the floating construction with respect to the connector blocks 114, 123.

What is claimed is:

1. A connector device for connecting at least electrical lines of a control device of a machine tool and an attachment on a pallet, said connector device comprising:

a movable portion provided at a machining table of the machine tool and including plural electrical couplings; and a fixed portion provided at the pallet and including complementary electrical couplings for engaging the electrical couplings of the movable portion, wherein said movable portion is movable between engagement and disengagement positions on said machining table, through a drive unit, for respectively engaging and disengaging the electrical couplings of the movable and fixed portions and is connected by respective electrical lines of the electrical couplings thereof to the control device of the machine tool, and wherein said fixed portion includes means for detachably connecting the fixed portion to said movable portion and is connected to the attachment on the pallet by respective electrical lines of the electrical couplings thereof, at least one of said movable portion and said fixed portion being formed with a shield member for electrically shielding said electrical couplings.

2. A connector device according to claim 1, wherein said electrical couplings are each formed by an insulating body provided with a connector pin or a connector socket for electric connection.

3. A connector device according to claim 1, wherein said movable portion and fixed portion include hydraulic couplings which are each formed with a receiving and inserting joining portion for communication of fluid.

4. A connector device according to claim 1, wherein said drive unit comprises a swinging lever and a cylinder for driving said swinging lever, the movable portion is connected to an extreme end of said swinging lever, said movable portion having a slide unit mounted thereon, and guide rails slidably engaged with said slide unit are provided to guide said movable portion.

5. A connector device according to claim 1, wherein said drive unit comprises a supersonic motor and a ball threaded shaft connected to said motor, said threaded shaft being screwed into a mount member, said mount member having the movable portion mounted thereon.

6. A connector device according to claim 1, wherein a front cover opened by the access of the movable portion is provided on said fixed portion.

7. A connector device according to claim 2, wherein said electrical couplings are mounted on the movable portion or the fixed portion by a floating construction.

* * * * *